United States Patent
Tait

(10) Patent No.: US 10,471,864 B1
(45) Date of Patent: *Nov. 12, 2019

(54) VEHICLE SEAT WITH THERMAL COMFORT MODULE

(71) Applicant: Faurecia Automotive Seating, LLC, Auburn Hills, MI (US)

(72) Inventor: Shaun Dorian Tait, Troy, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,802

(22) Filed: May 14, 2018

(51) Int. Cl.
    B60N 2/56 (2006.01)
(52) U.S. Cl.
    CPC .......... B60N 2/565 (2013.01); B60N 2/5685 (2013.01)
(58) Field of Classification Search
    CPC .. B60N 2/5642; B60N 2/5621; B60N 2/5685; B60N 2/565; B60N 2/5692; B60H 1/00564
    See application file for complete search history.

(56) References Cited

U.S. PATENT DOCUMENTS

| | | |
|---|---|---|
| 6,196,627 B1 | 3/2001 | Faust et al. |
| RE38,128 E | 6/2003 | Gallup et al. |
| 7,647,780 B2 | 1/2010 | Aoki et al. |
| 8,176,741 B2 * | 5/2012 | Kameyama ........ B60H 1/00285 62/239 |
| 8,393,162 B2 | 3/2013 | Chung |
| 2006/0175877 A1 * | 8/2006 | Alionte ................. A47C 7/74 297/180.14 |
| 2011/0061402 A1 | 3/2011 | Jun et al. |
| 2016/0152167 A1 * | 6/2016 | Kozlowski .......... B60N 2/5692 297/180.12 |
| 2018/0054858 A1 * | 2/2018 | Dry ..................... B60N 2/5642 |
| 2018/0111527 A1 * | 4/2018 | Tait ..................... B60N 2/5678 |
| 2018/0272836 A1 * | 9/2018 | Hunner .............. B60H 1/00285 |
| 2018/0344035 A1 * | 12/2018 | Dry ......................... A47C 7/74 |
| 2019/0061575 A1 * | 2/2019 | Tait ..................... B60N 2/5642 |

FOREIGN PATENT DOCUMENTS

| | | |
|---|---|---|
| CA | 2599057 A1 | 11/2006 |
| WO | 2015123585 A1 | 8/2015 |

* cited by examiner

*Primary Examiner* — Philip F Gabler
(74) *Attorney, Agent, or Firm* — Reising Ethington P.C.

(57) ABSTRACT

A vehicle seat includes a thermal comfort module installed in a recess of a foam cushion beneath a trim cover. The thermal comfort module includes an air duct, a thermoelectric device, a heat sink extending inside the air duct from the thermoelectric device, and an air mover that causes air to flow from the passenger cabin, through the seating surface, along the air duct and heat sink, and back out of the seat. In a seat cooling mode, the air flowing along air duct absorbs heat from one side of the thermoelectric device via the heat sink while the opposite side of the thermoelectric device absorbs heat from the trim cover via thermal conduction. The thickness of a foam cushion can be made greatest where most needed, such as at the rear portion of the seat bottom.

15 Claims, 2 Drawing Sheets

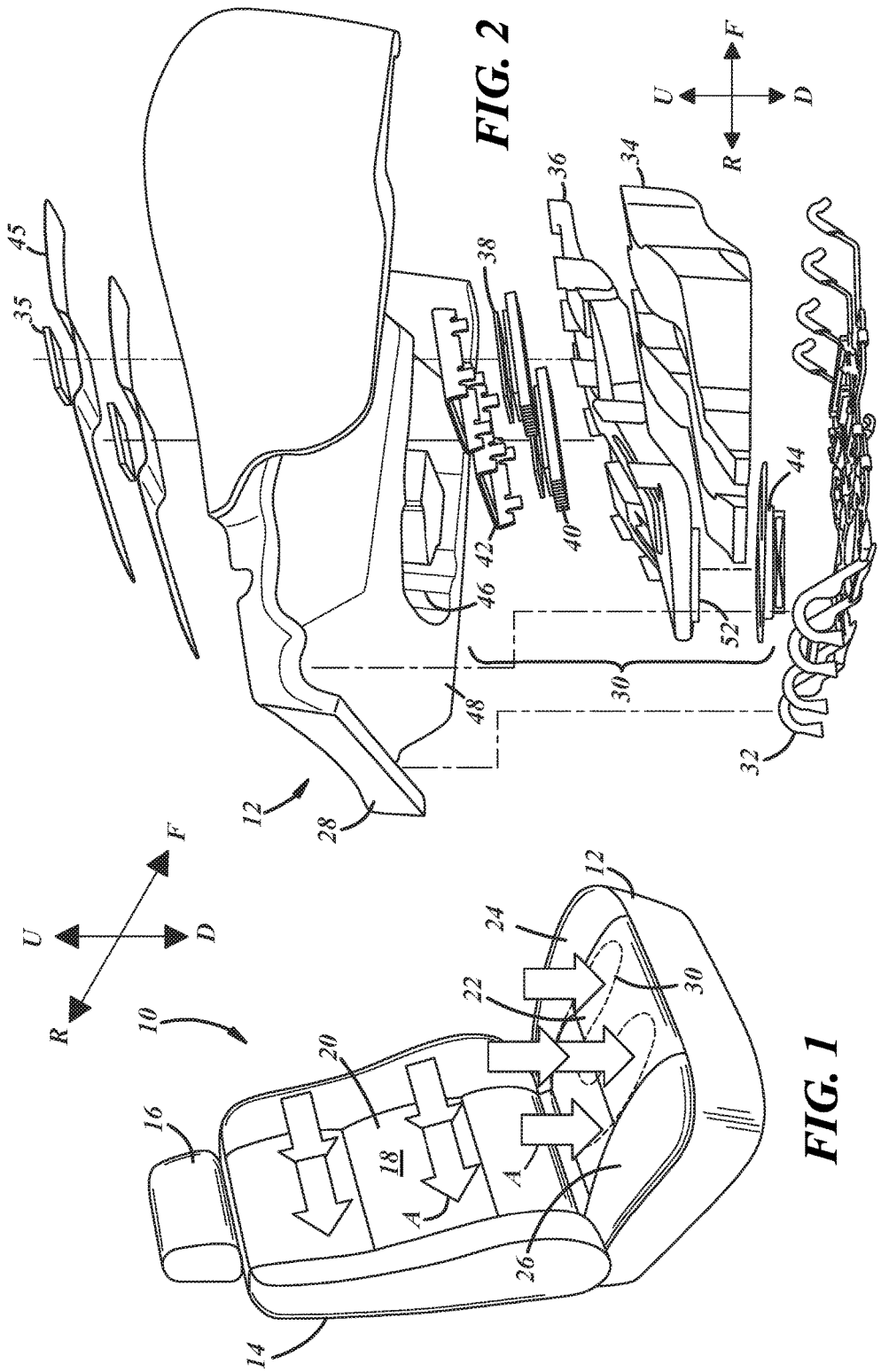

VEHICLE SEAT WITH THERMAL COMFORT MODULE

TECHNICAL FIELD

The present disclosure relates to a vehicle seat and, in particular, to a vehicle seat with a thermal comfort module.

BACKGROUND

Vehicle seats can be configured to provide a flow of air through the seating surface to enhance environmental comfort of the seat occupant by virtue of the movement of air in the vicinity of the seat occupant's physical contact with the seating surface, which is typically hotter or colder than the seat occupant desires, particularly when the seat occupant is initially seated on especially hot or cold days. Such ventilated vehicle seats may be configured to flow air past a heat exchanger in the seat to heat or cool the air before it is forced out of the seat through the seating surface as conditioned air to provide desired thermal comfort to the seat occupant.

For example, U.S. Pat. No. RE38,128 to Gallup et al. discloses a vehicle seat with a climate control system including individual heat pumps associated with the seat bottom and with the seat back. Dedicated fans blow air through each of the heat pumps, then along air channels inside the seat, and finally out of the seat through the seating surface. The seat back and seat bottom are separately controllable. The heat pumps may include thermoelectric modules that selectively heat or cool the air before it passes through the seating surface. Additional fans are provided to separately blow air along opposite sides of the thermoelectric modules. Heat energy is thus transferred to and from both opposite sides of the thermoelectric modules by forced convection only.

SUMMARY

In accordance with one or more embodiments, a vehicle seat includes a seat bottom and a seat back. At least one of the seat bottom or the seat back includes an air permeable trim cover including a seating surface, an air duct underlying the trim cover and defining an air flow channel in the seat, a thermoelectric device underlying the trim cover and having opposite first and second sides, a heat sink attached to the first side of the thermoelectric device and extending into the air flow channel, and an air mover. The air mover is operable to cause air to flow into the seat through the trim cover, along the air flow channel and heat sink, and out of the seat at a location away from the seating surface. The second side of the thermoelectric device is outside the air flow channel and arranged to modulate the temperature of the trim cover by thermal conduction.

In some embodiments, the vehicle seat includes a foam cushion and a conductive layer. A portion of the foam cushion lies between the trim cover and the air duct. The conductive layer is attached to the second side of the thermoelectric device and extends between the trim cover and the foam cushion.

In some embodiments, the air duct includes an intake port and an exhaust port spaced apart from the intake port in a vertical direction and in a horizontal direction.

In some embodiments, the air duct includes a plurality of intake ports and an exhaust port spaced apart from each one of the intake ports in a vertical direction and in a horizontal direction.

In some embodiments, the air duct includes an intake port and an exhaust port located below and rearward of the intake port.

In some embodiments, the air mover is operable to cause air to flow through the air flow channel in downward and rearward directions. The air mover may be coupled with the air duct at a rear end of the air duct and along a bottom side of the air duct to cause the air to flow is those directions.

In some embodiments, the vehicle seat includes a foam cushion disposed between the trim cover and the air flow channel. A thickness of the foam cushion is greater between the trim cover and a rear end of the air flow channel than between the trim cover and a front end of the air flow channel.

In some embodiments, the vehicle seat includes a foam cushion having a recess formed along a bottom side of the foam cushion, and the air duct is formed separately from the foam cushion and fits in the recess. A duct support piece may be fitted in the recess with the air duct interposed between the foam cushion and the duct support piece. The air duct may be formed from a plastic material having a stiffness greater than a stiffness of the material of the foam cushion.

In some embodiments, the seat bottom includes a structural frame having a transverse frame member. A front end of the air duct is located above the transverse frame member, and a rear end of the air duct is located below the front end of the air duct.

In some embodiments, the air duct includes a front end including an intake port, a rear end including an exhaust port, and a central portion between the front and rear ends. The thermoelectric device is coupled with the air duct so that the heat sink extends into the air flow channel at the central portion of the air duct.

In some embodiments, a pair of air flow channels is defined by the air duct and are laterally spaced apart at a front end of the air duct while converging at a rear end of the air duct.

In some embodiments, the vehicle seat includes an additional thermoelectric device having opposite first and second sides and an additional heat sink attached to the first side of the additional thermoelectric device. Each heat sink extends into a different one of a pair of air flow channels, and the second side of each thermoelectric device is outside the air flow channels and arranged to modulate the temperature of the trim cover by thermal conduction.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein:

FIG. 1 is a perspective view of an embodiment of a vehicle seat equipped with a thermal comfort module;

FIG. 2 is an exploded view of a seat bottom including a thermal comfort module;

DETAILED DESCRIPTION

Figure 3:
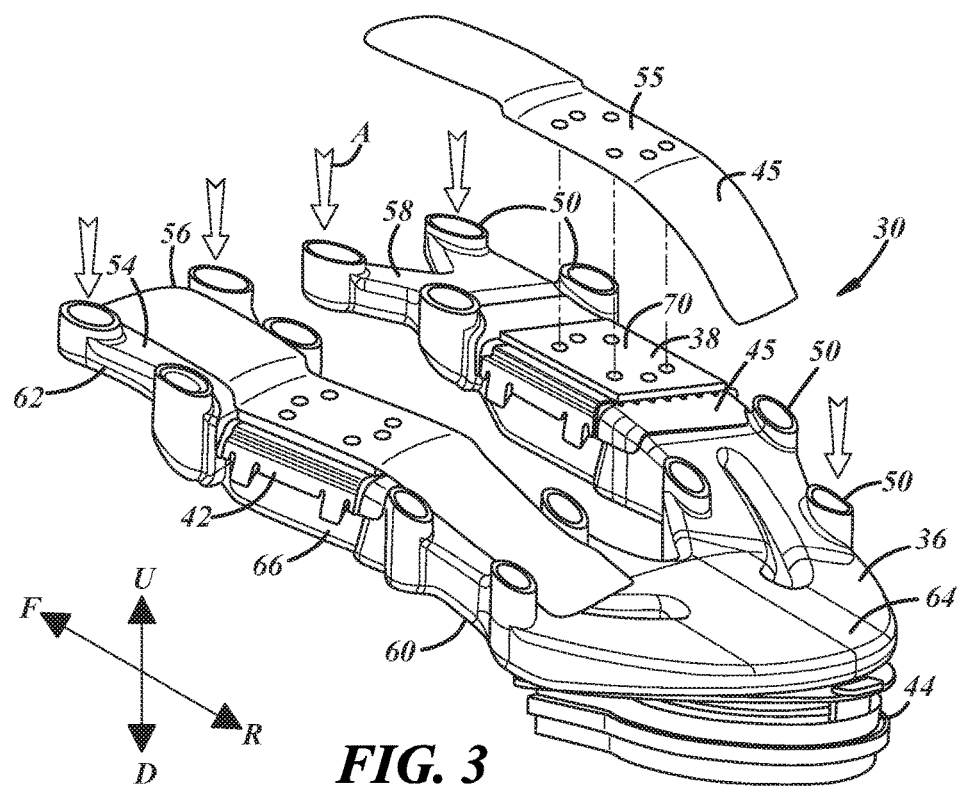
FIG. 3 is a perspective view of the thermal comfort module of FIG. 2.

The vehicle seat described below uses a thermoelectric device (TED) to help provide thermal comfort to a seat occupant by heating or cooling the seating surface with the TED via thermal conduction. In a cooling mode, air from the passenger cabin of the vehicle can be drawn through the seating surface by an air mover to provide a localized cooling sensation to the seat occupant and to remove heat from the hot side of the thermoelectric device. This air movement through the seating surface can also contribute to modulating the temperature of the seating surface via convective heat transfer. An air duct within the seat can be shaped to position the TED near the seating surface for enhanced conductive energy exchange and away from high occupant load areas of the seat to maximize occupant comfort.

FIG. 1 illustrates an exemplary vehicle seat 10 adapted for installation in the passenger cabin of a vehicle via rails along the underside of the seat or other suitable attachment features. The seat 10 includes a seat bottom 12 that supports the majority of the weight of a seat occupant when in use and a seat back 14 extending from the seat bottom. The seat back 14 includes a head rest 16 in this example. Forward (F) and rearward (R) directions are designated in FIG. 1 and may be referred to as longitudinal directions. Upward (U) and downward (D) directions may be referred to as vertical directions, while left and right may be referred to as transverse directions. These directions are with respect to the seat 10 and not necessarily with the vehicle in which the seat is installed. The seat 10 presents a seating surface 18 in the form of an exterior surface of a trim cover 20. Each of the seat bottom 12 and the seat back 14 includes a portion of the seating surface 18, which is in contact with the seat occupant in use. As used herein, the terms "underlying" and "overlying" are in relation to a reference frame in which the seating surface 18 is the topmost surface. For example, an underlying layer in the seat back 14 is generally located rearward of the portion of the seating surface 18 provided by the seat back, and an underlying layer in the seat bottom 12 is generally located beneath the portion of the seating surface provided by the seat bottom.

The seat 10 is a ventilated seat configured to provide an air flow (A) through the seating surface 18 when an underlying seat component is pressurized or depressurized, such as via an internal or external fan or blower. The air flow may include air discharged into the passenger cabin through the seating surface in a positive-ventilation or "push" configuration, or it may include ambient air from the vehicle passenger cabin pulled through the seating surface 18 in the illustrated negative-ventilation or "pull" configuration. Positive and negative ventilation may also be combined, with positive ventilation of the seat bottom 12 and negative ventilation of the seat back 14, or vice versa. Or the seat bottom and/or the seat back can each have positive and negative ventilated portions. As noted above, air exiting the seat through the seating surface may be heated or cooled by a heat exchanger prior to exit. The embodiments of the thermal comfort module illustrated in the figures are configured particularly for a pull system, but many of the disclosed advantages may be realized if reconfigured as a push system.

Air flow through the seating surface 18 is enabled in part by at least a portion of the trim cover 20 being air permeable. Perforated leather is one example of an air permeable trim cover 20. Certain woven or knit fabrics are also air permeable. Polymeric materials such as polyvinyl chloride (PVC) or polyurethane can also be used in the trim cover 20 and can be made air permeable via perforations or other suitable means. Different types of materials may also be combined to form the trim cover, so long as it is air permeable at the desired locations. The trim cover 20 may also be a multi-layer material including a plurality of different air permeable materials laminated or otherwise attached together. In the illustrated example, the air flow includes air drawn into the seat 10 along a central portion 22 of both the seat bottom 12 and the seat back 14, which is located between bolster portions 24, 26 located along opposite left and right sides of the seat 10. The following description and illustrations are with respect to the seat bottom 12 but are applicable to the seat back 14 as well.

FIG. 2 is an exploded view of a portion of the seat bottom 12 with the trim cover omitted. The illustrated seat bottom 12 includes a foam cushion 28, a thermal comfort module 30, a seat pan 32 that supports the overlying components, duct support pieces 34 that support a portion of the thermal comfort module that is spaced away from the seat pan 32, and cushion inserts 35 that fill space between the module 30 and the trim cover as described in further detail below. The thermal comfort module 30 includes an air duct 36, a pair of thermoelectric devices 38, corresponding pairs of heat sinks 40 and retainers 42, an air mover 44, and a conductive layer 45. As illustrated in FIG. 3, the air duct 36 and thermal comfort module 30 may have a U-shape or have an otherwise branched shape for placement in the central portion of the seat bottom 12 with the branches generally corresponding to the location of the legs of the seat occupant, as shown in FIG. 1. The thermal comfort module 30 fits in a recess 46 formed in the foam cushion 28 with contours matching those of the portion of the module it contacts. In this example, the recess 46 is formed along a bottom side 48 of the cushion. The duct support pieces 34 fill the remainder of the recess 46 between the thermal comfort module 30 and the seat pan 32. The module 30 could also be insert-molded into the foam cushion 28. In some embodiments, the seat pan 32 is considered part of the thermal comfort module 30.

The primary function of the foam cushion 28 is to support the seat occupant in a comfortable manner by isolating the occupant from the underlying structural members of the seat and vehicle. The cushion 28 may be a single continuous piece of molded foam or may be constructed from multiple pieces of foam of various densities, for example. The duct support pieces 34 may be constructed from the same foam material as the cushion 28 or from any other suitable material and/or may be considered as part of the foam cushion. The seat pan 32 may generally bridge the distance between structural frame members. For instance, the seat bottom 12 may include a pair of structural frame members spaced transversely from each other and extending in the longitudinal direction, along with another pair of structural frame members spaced longitudinally from each other and extending in the transverse direction. In the illustrated example, the seat pan 32 is a wire-frame configuration of a suitably rigid material (e.g. steel) with front and rear ends having hook shapes to engage front and rear transverse frame members. This configuration is non-limiting, as any sufficiently rigid component(s) can serve as the seat pan or as structural components such as frame members.

As illustrated in FIG. 3, the thermal comfort module 30 includes a plurality of air flow ports, including at least one air intake port 50 and at least one exhaust port 52 (FIG. 2). Each port facilitates air flow between an internal air channel of the air duct 36 and locations outside the air duct. In this example, a plurality of air intake ports 50 are arranged along a top side 54 of each of two branches 56, 58 of the duct 36, and the air mover 44 is mounted at the exhaust port along a bottom side 60 of the air duct 36 where the two branches of the duct meet. The air intake ports 50 may be arranged along inner and outer edges of the branches 56, 58 of the duct 36 as shown, thereby locating a plurality of air intake ports generally along each of the inside and the outside of each of the right and left legs of the seat occupant. The illustrated air duct 36 thus defines a pair of internal air flow channels—one in each branch 56, 58—that are laterally spaced apart at a front end 62 of the duct and converging at a rear end 64 of the duct. Separate TEDs 38 located along each branch 56, 58 of the duct 36 have attached heat sinks extending into each one of the pair of air flow channels.

In this example, some of the intake ports 50 are located at the front end 62 of the air duct 36, the exhaust port 52 is located at the rear end 64 of the air duct, and the thermoelectric devices 38 are located at a central portion 66 of the air duct between the front and rear ends. Additional air intake ports 50 are located along the duct 36 between the TEDs and the exhaust port 52 in this example. It should be understood that the air duct 36 may include any number of intake ports and exhaust ports in any of multitudes of possible arrangements, the air mover 44 could be located anywhere along and/or inside the duct, and the thermal comfort module 30 could be operated in reverse with the air mover 44 operating to pull air into the rear bottom port 52 and discharge air from the ports 50 along the top of the duct 36, whether or not the TEDs 38 are operating. Also in this example, the air mover 44 discharges air in a frontward direction below and at a rear portion of the seat bottom 12. However, the air mover 44 could be located elsewhere, and the air could be discharged at a different location and/or in a different direction than illustrated.

The air duct 36 may be considered the main body of the thermal comfort module 30 to which the other components are attached and supported for assembly into the vehicle seat. The air duct 36 may be formed from an injection moldable thermoplastic material and, being hollow, may be formed in more than one piece (e.g., top and bottom halves) that are assembled together to form the duct, or the air duct may be formed in a blow molding process. The material of the air duct 36 should be sufficiently rigid to hold its shape under the load of the seat occupant without collapsing the internal air channel. Also, the material of the air duct 36 may be selected to be sufficiently flexible to conform to seat occupant applied loads without cracking or being overtly noticeable to the seat occupant. One example of a suitable material is an olefin-based polymeric material such as TPO with a high elastomeric content. Certain thermoplastic elastomers (TPEs) are suitable as well, including olefin-based TPEs. The air duct material may have a stiffness that is greater than that of the foam cushion material. Plastic materials are favored for their ease of molding into complex shapes and their low thermal conductivity, which can reduce or minimize the amount of conductive thermal energy transfer between the air duct 36 and the TED 38.

The air duct 36 may be formed with an opening along the top side 54 to receive the TED 38 and attached heat sink with a first side 68 (FIG. 4) of the TED facing the inside of the air duct and an opposite second side 70 exposed along the top side 54 of the air duct through an opening in the retainer 42, which is configured to secure the TED and heat sink to the air duct 36. The TEDs 38 are solid-state electrically powered heat pumps including particular dissimilar semi-conducting materials arranged between electrodes and/or thermally conductive plates and that produce a temperature differential across the conductive plates when a voltage is applied thereacross. Reversing the polarity of the applied voltage reverses the direction of the temperature differential and, thereby, the heat flux through the TED 38.

Figure 4:
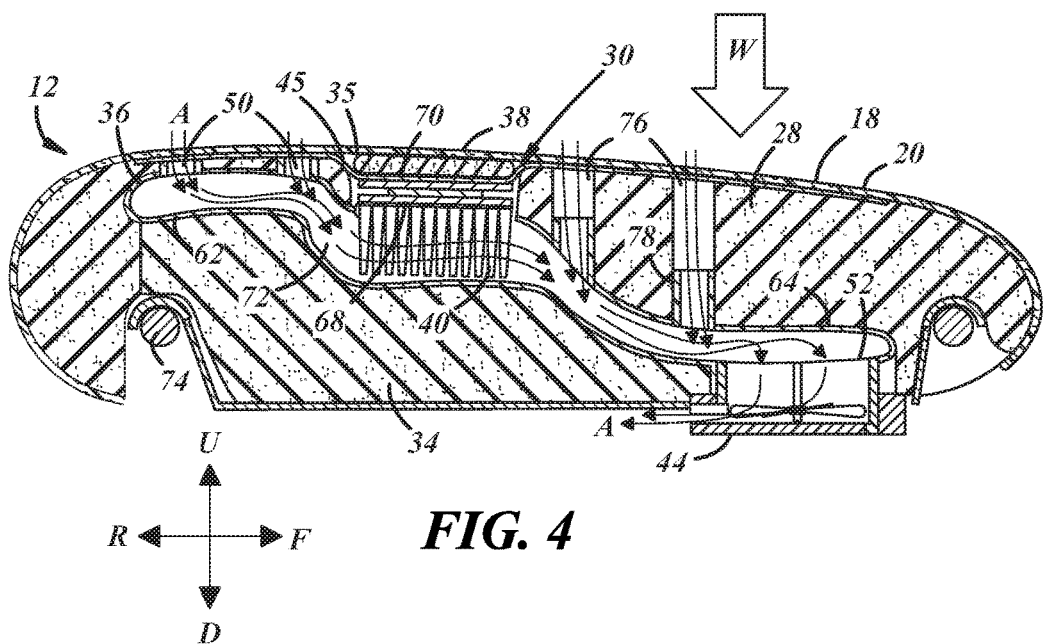
FIG. 4 is a cross-sectional view of a seat bottom equipped with an illustrative thermal comfort module illustrating air flow through the module.

In this example, one thermally conductive plate of each TED 38 provides the exposed side second side 70 of the TED. The heat sink 40 is affixed to another thermally conductive plate that provides the first side 68 of the TED and is located inside the air duct 36, as illustrated in FIG. 4. The thermally conductive layer 45 is in the form of two thin and flexible strips comprising a thermally conductive material. Each strip includes a central portion 55 attached to the second side 70 of one of the TEDs 38, and each strip extends in opposite frontward and rearward directions from the central portion 55 to opposite ends that correspond to the opposite front and rear ends 62, 64 of the duct 36. With the illustrated U-shaped air duct 36 and thermal comfort module, the conductive layer 45 is thereby located generally beneath the legs of the seat occupant. The illustrated conductive layer is non-limiting and may take on a variety of different shapes and be placed in conductive contact with the TED anywhere along the conductive layer and/or may be in some other non-strip form.

FIG. 4 is a cross-sectional view of the seat bottom 12 equipped with an illustrative thermal comfort module 30 similar to that of FIG. 3. The seat bottom 12 is illustrated with the air permeable trim cover 20 which includes the occupant seating surface 18. The thermal comfort module 30 underlies the trim cover 20, and the air duct 36 defines an air flow channel 72 in the seat. The air flow channel 72 is defined by the inner surface of the air duct 36. The thermoelectric device 38 also underlies the trim cover 20, with the heat sink 40 attached to the first or bottom side 68 of the TED and extending into the air flow channel 72. The air mover 44 is a fan, blower, pump, or other suitable device operable to cause air to flow into the seat through the air permeable trim cover 20, along the air flow channel 72 and heat sink 40, and then back out of the seat at a location away from the seating surface 18, such as beneath the seat. The second or top side 70 of the thermoelectric device 38 is outside the air flow channel 72 and is arranged to modulate the temperature of the trim cover 20 by thermal conduction.

This means that there is a continuous path of solid material between the second side 70 of the TED 38 and an inner surface of the trim cover 20. The solid materials along this path preferably have a high thermal conductivity on the order of metallic materials, which is generally greater than 10 W/m-K and preferably greater than 100 W/m-K. Copper, aluminum, or graphite foils or layers are some examples of materials that may be included in the path of solid material between the second side of the TED and the trim cover. In another manner of describing this thermal conduction type of temperature control and thermal energy exchange, there is an absence of air or other fluid flow between the second side of the TED and the trim cover—i.e., there is substantially no forced convection or other convective heat transfer between the second side of the TED and the trim cover.

In the illustrated embodiments, the conductive heat exchange between the TED 38 and the trim cover is facilitated by the thermally conductive layer 45, a portion of which is attached to the second or top side 70 of the TED 38, and other portions of which extend away from the TED to locations between the foam cushion 28 and the trim cover 20. In one embodiment, the conductive layer 45 includes one or more flexible strips of graphite or multi-layer graphene. In a more particular example, each flexible strip includes graphite pressed and laminated between protective carrier films, such as metal foils or polymer films that are sufficiently thin to minimize thermal losses. Such strips may be about 0.5 mm to 2.0 mm thick, with the majority of the thickness provided by the graphite. The conductive layer 45 serves to selectively locate areas of high thermal energy exchange wherever desired along the seating surface—i.e., without the conductive layer, heating and cooling by the TED via thermal conduction is limited to the relatively small area at the second side of the TED.

The thermally conductive layer 45 also allows the TED to be spaced away from the trim cover 20 as illustrated to make it less noticeable or unnoticeable to the seat occupant. In the illustrated embodiment, the cushion insert 35 separates the second side 70 of the TED 38 from the trim cover. The cushion insert 35 may be formed from a similar type of foam material as the foam cushion 28 and fills a space between the TED 38 and the trim cover ranging from about 5 mm to about 25 mm. Depending on the particular materials and TED location, a spacing between about 10 mm and about 20 mm, or about 15 mm may be sufficient to make the TED virtually undetectable to the seat occupant with use of the cushion insert 35. It is however contemplated that TEDs could be configured with relatively flexible thermally conductive plates along their opposite sides to place the TED closer to the trim cover.

The conductive strips 45 may be pre-assembled to the TEDs as part of the thermal comfort module 30, with the opposite ends of the strips fed through openings along the top of the foam cushion 28 when the module is received in the recess along the bottom of the foam cushion. This allows the ends of conductive strips to lie along the top of the foam cushion 28 at the desired locations in thermally conductive contact with the TEDs before the trim cover is attached. The trim cover 20 can then be disposed over the foam cushion 28 after the cushion insert 35 is placed over the central portion 55 of each strip above each TED 38.

During operation in a cooling mode, the air mover 44 operates to cause air flow (A) in the illustrated direction through the air duct 36. The TED 38 is powered with a voltage and current flow that causes the first side 68 of the TED to be the hot side and the second side 70 of the TED to be the cold side. The seat occupant experiences a cooling sensation provided in part by the TED 36 extracting thermal energy through the trim cover 20 via the conductive layer 45 and in part by the air movement in the vicinity of their legs and the associated evaporation of perspiration. Some of the same air that moves past the seat occupant's legs at the seating surface 18 also flows along the heat sink 40 toward the exhaust port 52 and absorbs thermal energy from the first side 68 of the TED, thereby maintaining the capacity of the TED to absorb thermal energy at the second side 70. In a heating mode, the polarity of the voltage and the direction of current flow through the TED 38 is reversed so that the first side 68 of the TED is the cold side and the second side 70 of the TED is the hot side. The seat occupant experiences a heating sensation provided at least in part by the TED 38 transferring thermal energy through the trim cover. The air mover 44 may be optionally operated in the heating mode to allow the first side 68 of the TED to absorb available thermal energy from the air flow via the heat sink 40 to help maintain the capacity of the TED to provide thermal energy at the second side 70.

As illustrated in the figures, one or more of the intake ports 50 and may be spaced apart from the exhaust port 52 in vertical and horizontal directions. In the case of the illustrated seat bottom 12, the exhaust port 52 is located both below and rearward of each one of the plurality of intake ports 50. This results in a direction of air flow through the seat that is generally down and away from an upper-front portion of the seat bottom toward a lower-rear portion of the seat bottom. The shape of the air duct 36 that results in this arrangement of intake and exhaust ports 50, 52 has other beneficial features.

For example, the thickness of the portion of the foam cushion 28 over the rear end 64 of the air duct 36 is greater than the thickness of the portion of the foam cushion over the front end 62 of the air duct. This provides more cushioning where it is needed most toward the rear of the seat bottom 12 where the majority of the weight (W) of the seat occupant is supported—making the presence of the thermal comfort module 30 less detectable by the seat occupant. This air duct shape also places the TED 38 relatively close to the trim cover 20, which reduces thermal losses along the thermally conductive layer 45 and reduces the amount of bending required for the conductive layer to reach from the trim cover 20 to the TED. For example, if the TED 38 is located along the bottom of the foam cushion 28, where it would be least detectable by the seat occupant, the conductive layer must extend vertically through the foam cushion to a greater extent, and the required bending angle of the conductive layer would be much greater than illustrated in FIG. 4—i.e., closer to 90 degrees.

Such sharp bends can have a negative effect on the thermal conductivity of the conductive layer, especially when the conductor is a relatively brittle material such as graphite. Bending a graphite-containing layer to high angles can cause a thermally "open" condition, analogous to breaking a wire in an electrical connection. Also, there are thermal losses along the length of the thermally conductive layer 45, analogous to electrical losses along an electrical cable, such that the longer the conductive layer, the less efficient is the thermal energy transfer between the TED and the desired locations of the trim cover. Also, thermally conductive materials can be relatively expensive compared to other materials of the seat bottom, such as foam and other polymeric materials. The ability to place the TED closer to the trim cover reduces the amount of thermally conductive material necessary in the thermally conductive layer, or it allows a thicker and more conductive layer to be made with the same amount of material in a longer thinner layer.

Additionally, placement of the second side 70 of the TED 38 outside the air flow channel 72 avoids inadvertent heating or cooling of the second side of the TED and/or the conductive layer 45, which would reduce TED performance. The illustrated construction with a path of solid material that limits the heat transfer mode to conduction while avoiding convection optimizes TED performance.

The illustrated air duct shape and thermal comfort module configuration also facilitates routing the air flow through the seat while avoiding structural members. For instance, as noted above, the seat bottom 12 may include a structural frame that supports or includes the seat pan 32. The cross-section of FIG. 4 is taken through a transverse frame member 74 located toward the front of the seat bottom 12, and the front end 62 of the air duct 36 is located above the frame member 74. The rear end 64 of the air duct 36 may be located below the frame member 74.

The illustrated embodiment has the air duct 36 formed as a separate piece from the foam cushion 28 and fitting into a same-shaped recess in the foam cushion with duct support pieces 34 supporting the duct where spaced away from the seat pan 32. The air channel 72 defined by the inner surface of the duct 36 is fluidly connected with additional air channels 76 that extend between the air duct and the outer surface of the foam cushion 28. The illustrated air channels 76 are formed through the foam cushion 28 along the recess into which the air duct 36 fits and are aligned with the air intake ports 50 of the air duct 36. A tubular portion 78 of the air duct 36 extends into each one of the air channels 76 of the cushion 28, with at least the rearmost air intake ports 50 provided on tubular portions that extend only partly along the air channel 76 so that the intake ports 50 are spaced from the trim cover 20. This spacing also helps prevent the presence of the thermal comfort module 30 from being noticeable to the seat occupant. The forwardmost air intake ports may be closer to the trim cover, as shown, as they are less detectable due to less occupant weight being distributed there.

It is also possible to form the air flow channel 72 as one with the air channels 76 of the foam cushion 28, omitting the separately formed air duct so that the foam cushion itself acts as the air duct with an air channel arrangement that provides air flow in the downward and rearward directions. Such a construction achieves similar benefits in that the rigid air mover 44 can be located beneath a thick portion of the foam cushion with the air channel 70 routed above forward structural members of the seat bottom.

The vehicle seat may include other components and/or layers that are not explicitly illustrated in the figures, such as a reticulated foam or 3D-mesh layer between the foam cushion 28 and trim cover 20, or additional air channels formed along the top side of the foam cushion and/or in non-vertical orientations. Resistance-type heating elements could be included to supplement or to be the primary source of heating in a heating mode, and the disclosed arrangements do not preclude the use of circulatory fluid cooling systems. While described above primarily as part of the seat bottom 12, at least certain features of the disclosed thermal comfort module may also be employed for occupant comfort control along the seat back. For instance, the air flow channel may be defined in the seat back 14 (FIG. 1) such that the air flows down and away from an upper portion of the seat back near the seat occupant's shoulders while exiting the seat at along a rear lower portion of the seat back. The TED could be located near the trim cover at a location along the seat back where the seat occupant load is relatively low with the air duct spaced further from the trim cover with thicker foam cushion material at a location where the seat occupant load is relatively high, such as the lumbar area. This would also allow the air duct and internal air channel to be routed around a lumbar support mechanism or other structural members of the seat back.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle seat comprising a seat bottom and a seat back, at least one of the seat bottom or the seat back comprising:
   an air permeable trim cover including a seating surface;
   an air duct underlying the trim cover and defining an air flow channel in the seat;
   a thermoelectric device underlying the trim cover and having opposite first and second sides;
   a heat sink attached to the first side of the thermoelectric device and extending into the air flow channel; and
   an air mover operable to cause air to flow into the seat through the trim cover, along the air flow channel and heat sink, and out of the seat at a location away from the seating surface,
   wherein the second side of the thermoelectric device is outside the air flow channel and arranged to modulate the temperature of the trim cover by thermal conduction.

2. A vehicle seat as defined in claim 1, further comprising a foam cushion and a conductive layer, wherein a portion of the foam cushion lies between the trim cover and the air duct, and wherein the conductive layer is attached to the second side of the thermoelectric device and extends between the trim cover and the foam cushion.

3. A vehicle seat as defined in claim 1, wherein the air duct comprises an intake port and an exhaust port spaced apart from the intake port in a vertical direction and in a horizontal direction.

4. A vehicle seat as defined in claim 1, wherein the air duct comprises a plurality of intake ports and an exhaust port spaced apart from each one of the intake ports in a vertical direction and in a horizontal direction.

5. A vehicle seat as defined in claim 1, wherein the air duct comprises an intake port and an exhaust port located below and rearward of the intake port.

6. A vehicle seat as defined in claim 1, wherein the air mover is operable to cause air to flow through the air flow channel in downward and rearward directions.

7. A vehicle seat as defined in claim 6, wherein the air mover is coupled with the air duct at a rear end of the air duct and along a bottom side of the air duct to cause the air to flow is said directions.

8. A vehicle seat as defined in claim 1, further comprising a foam cushion disposed between the trim cover and the air flow channel, wherein a thickness of the foam cushion is greater between the trim cover and a rear end of the air flow channel than between the trim cover and a front end of the air flow channel.

9. A vehicle seat as defined in claim 1, further comprising a foam cushion having a recess formed along a bottom side of the foam cushion, wherein the air duct is formed separately from the foam cushion and fits in the recess.

10. A vehicle seat as defined in claim 9, further comprising a duct support piece that fits in the recess with the air duct interposed between the foam cushion and the duct support piece.

11. A vehicle seat as defined in claim 9, wherein the air duct is formed from a plastic material having a stiffness greater than a stiffness of the material of the foam cushion.

12. A vehicle seat as defined in claim 1, wherein the seat bottom includes a structural frame comprising a transverse frame member, a front end of the air duct being located above the transverse frame member and a rear end of the air duct being located below the front end of the air duct.

13. A vehicle seat as defined in claim 1, wherein the air duct comprises a front end including an intake port, a rear end including an exhaust port, and a central portion between the front and rear ends, the thermoelectric device being coupled with the air duct so that the heat sink extends into the air flow channel at the central portion of the air duct.

14. A vehicle seat as defined in claim 1, wherein the air flow channel is one of a pair of air flow channels defined by the air duct, the air flow channels being laterally spaced apart at a front end of the air duct and converging at a rear end of the air duct.

15. A vehicle seat as defined in claim 14, further comprising an additional thermoelectric device having opposite first and second sides and an additional heat sink attached to the first side of the additional thermoelectric device, wherein each heat sink extends into a different one of the pair of air flow channels, and wherein the second side of each thermoelectric device is outside the air flow channels and arranged to modulate the temperature of the trim cover by thermal conduction.

\* \* \* \* \*